(12) United States Patent
Tell et al.

(10) Patent No.: US 7,647,052 B2
(45) Date of Patent: Jan. 12, 2010

(54) METHOD AND GATEWAY FOR CONTROLLING CALL ROUTING

(75) Inventors: Daniel F. Tell, Lake Forest, IL (US); Richard J. Malcolm, Carol Stream, IL (US)

(73) Assignee: Motorola, Inc., Schaumburg, IL (US)

( * ) Notice: Subject to any disclaimer, the term of this patent is extended or adjusted under 35 U.S.C. 154(b) by 372 days.

(21) Appl. No.: 11/228,155

(22) Filed: Sep. 16, 2005

(65) Prior Publication Data

US 2006/0019666 A1 Jan. 26, 2006

Related U.S. Application Data

(62) Division of application No. 10/712,646, filed on Nov. 13, 2003, now Pat. No. 7,142,852.

(51) Int. Cl.
*H04W 40/00* (2009.01)
(52) U.S. Cl. ............... 455/445; 455/435.2; 455/432.2; 455/525; 455/464; 455/62
(58) Field of Classification Search ............... 455/445, 455/435.2, 432.2, 525, 464, 62
See application file for complete search history.

(56) References Cited

U.S. PATENT DOCUMENTS 5,911,120 A 6/1999 Jarrett et al.
6,996,396 B1 * 2/2006 Snapp .................. 455/417
2001/0014614 A1 8/2001 Lautenschlager et al.
2002/0034190 A1 * 3/2002 Baratz et al. .............. 370/450
2002/0198977 A1 12/2002 Cho
2003/0134638 A1 7/2003 Sundar et al.
2004/0047320 A1 * 3/2004 Eglin ....................... 370/338

FOREIGN PATENT DOCUMENTS

| JP | 03264868 A | 9/2003 |
|----|------------|--------|
| WO | 9501074 | 1/1995 |
| WO | 9721315 | 6/1997 |
| WO | 9922493 | 5/1999 |
| WO | 0227640 A2 | 4/2002 |
| WO | 03090013 A2 | 10/2003 |

* cited by examiner

*Primary Examiner*—Nghi H Ly (57) ABSTRACT

A gateway (111, 200) and method for routing calls for a wireless communication unit (113) via a selected network (105, 124, 131) comprises an access point (217) supporting a wireless LAN and a modem (203, 229) for wireless connections to a wireless WAN and an interface 227 with a wired local loop (105). The methodology involves using a first network, such as a local loop if available and a second network, such as a packet data WAN 131 otherwise as well as maintaining the busy status of the first network via the second network.

4 Claims, 5 Drawing Sheets

METHOD AND GATEWAY FOR CONTROLLING CALL ROUTING

RELATED APPLICATIONS

This is a divisional of U.S. application Ser. No. 10/712,646, filed Nov. 13, 2003.

FIELD OF THE INVENTION

The present invention relates to wireless communications, and more specifically methods and apparatus for controlling call routing for a communications unit.

BACKGROUND OF THE INVENTION

Given the increasing pervasiveness of wide area networks (WANs), such as cellular networks (CNs), and the increased bandwidth and system capacity available for new cellular systems that are being deployed, it is expected that cellular WANs will become legitimate suppliers of broadband network services for residential customers. It is also possible that cellular WANs will provide alternative network access for voice and data with the development of voice over internet protocol (IP) for residential customers.

However, it is also expected that the public switched telephone network (PSTN) via local loops will remain a viable network for ordinary voice communications and further that the tariffs for local loop service will be lower than tariffs for cellular or cellular broadband access. While call forwarding exists this does not address complex call termination options or call origination issues unless unique devices are used or allow for routing via a preferred network.

Therefore, what is needed is a method and apparatus for controlling call routing.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages in accordance with the present invention.

DETAILED DESCRIPTION OF THE PRESENTLY PREFERRED EXEMPLARY EMBODIMENTS

In overview, the present disclosure concerns systems, methods, and equipment or apparatus that provide communications services to subscribers or users of such systems and equipment and specifically techniques for controlling call routing via a selected network suitable for utilization in a residential environment. More particularly, various inventive concepts and principles embodied in systems, apparatus, wireless communication units or subscriber devices, and methods therein for providing, initiating, or facilitating a novel and seamless cost effective call routing solution is discussed and described. Note that the wireless communications units or subscriber devices can be a variety of devices. Such wireless subscriber devices include personal digital assistants, personal messaging units, personal computers, wireless handsets or devices, or equivalents thereof, provided such devices are arranged and constructed for operation on multiple wireless networks, such as a wide area network and a local area network.

The communications systems and wireless subscriber devices that are of particular interest are those that may provide or facilitate voice or data or messaging services over wide area networks (WANs). Such conventional two way systems and devices include various cellular phone systems including analog and digital cellular, CDMA (code division multiple access) and variants thereof, GSM (Global System for Mobile), GPRS (General Packet Radio System), 2.5 G and 3G systems such as UMTS (Universal Mobile Telecommunication Service) systems, integrated digital enhanced networks and variants or evolutions thereof. Furthermore, the wireless communications devices or units of interest, in various embodiments, will have short range communications capability normally referred to as W-LAN capabilities, such as IEEE 802.11, Bluetooth, or Hiper-Lan and the like that preferably utilize CDMA, frequency hopping, TDMA (time division multiple access), OFDM (orthogonal frequency division multiple) access technologies and one or more of various networking protocols, such as TCP/IP (Transmission Control Protocol/Internet Protocol), IPX/SPX (Inter-Packet Exchange/Sequential Packet Exchange), Net BIOS (Network Basic Input Output System), or integrated digital enhanced network protocols.

As further discussed below, various inventive principles and combinations thereof are advantageously employed to route calls via preferred networks. Note that this general rule will have various exceptions where such call routing is not appropriate such as when the preferred network is not available to the wireless communications unit due to physical location or is otherwise occupied and so forth as will be explained and developed below. In this manner, a wireless device or unit can send and receive calls through the appropriate network providing the principles or equivalents thereof as discussed below are utilized.

The instant disclosure further explains in an enabling fashion the best modes of making and using various embodiments in accordance with the present invention. The disclosure further offers to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

Figure 1:
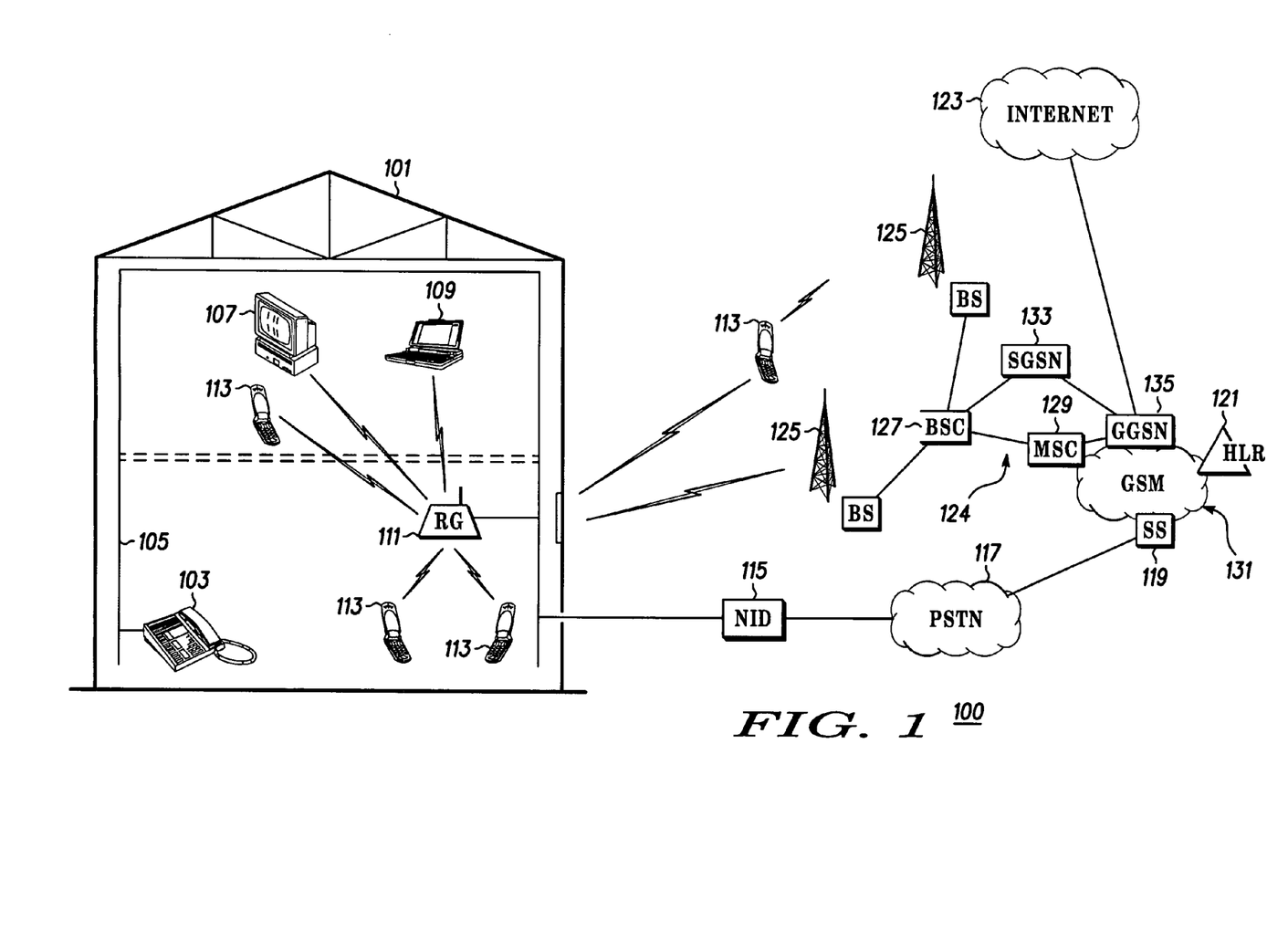
FIG. 1 is a diagram of an exemplary environment depicting a local area network and wide area network with a residential communications system.

Referring to FIG. 1, a diagram of an exemplary environment depicting a local area network and wide area network with a residential communications system will be discussed and described. The combined system 100 is compliant with one or more air interface standards, such as GSM, CDMA, or the like as noted above, and is capable of providing two-way voice or data communications, or both, with appropriate wireless or wired communication units.

The diagram includes a residence 101 that is provided with plain old telephone service (POTS) supplied via a local loop 105 to telephone unit 103 and other devices with a POTS interface, such as possible one or more computers, such as computer 107 and a residential gateway 111. As is known, the local loop 105 typically used in the residence 101 usually limits voice traffic delivery options to multiple telephone lines and call waiting. Some regions also provide DSL (digital subscriber link) service when such service is available via the local loop. The telephone unit 103 may be any telephone device such as corded, cordless, or the like that is compliant with any POTS. The POTS is capable of sending and receiving voice and data transmissions through a communication link established with a public switched telephone network (PSTN) 117 via network interface device (NID)) 115. The PSTN 117 that provides POTS is a circuit-switched network. When a call is made between two parties using POTS, the connection is maintained for the entire duration of the call. The gateway 111 or residential gateway will be further discussed below, however it is worth noting that the gateway 111 supports a wireless local area network (LAN) that allows properly equipped devices, such as wireless communication units 113 and the computers 107, 109 to couple via the LAN to the gateway.

In addition it is expected that the residence 101 will also have or be within range of other communication networks and services, such as one or more wireless wide area networks (WANs). As depicted in a simplified form, one such WAN is a conventional cellular system or WAN 124 comprising base sites 125, base site controllers 127 (one depicted), a mobile switching center 129 and associated home location register 121 all inter coupled as depicted. Note that in some embodiments this cellular WAN may be a circuit switched GSM WAN, sometime known as a second generation network. Furthermore another wireless WAN is shown and available for service. This WAN is depicted, by way of example as a known GSM based WAN 131 with relatively broadband packet switched service, such as a GPRS, 2.5G, or 3G network, and comprises the base sites 125, base site controllers 127, SGSN(s) (serving GPRS support node) and GGSN (Gateway GPRS support node) all inter coupled as depicted with each other as well as the MSC 129 and HLR 121. This WAN 131 allows or supports broadband connections to the Internet 123 as well as VoIP (voice over Internet protocol) voice connections to properly equipped communications devices. As is known the GSM based WAN 131 is packet switched rather than circuit switched as is often the case for the cellular WAN (first generation WAN) 124 and the local loop. Note further that while described here as two WANs, these networks are often collectively viewed as a WAN with packet switched and circuit switched services.

The wireless communication units 113 represent any type of wireless communications device or unit, such as wireless phones, radiotelephones including those adapted for coupling with data terminals (e.g., portable computers), dedicated data units (e.g., personal digital assistants), or wireless adapter devices (e.g., wireless modems adapted for coupling with computers, message pads, etc.) capable of establishing a communication link over a WAN. The wireless communication units 113 in some instances and some embodiments are capable of sending and receiving voice and/or data through a communication link established with the wireless WANs, including specifically the cellular WAN 124 and possibly the GSM WAN 131 as well as the wireless LAN supported by the gateway 111. Note that when the wireless communications devices are proximate to the residence or specifically the gateway 111 they are expected to be in communication with the gateway rather than with the WANS 124, 131. The wireless communication units 113 will include appropriate circuitry and functionality such as transceivers and controllers to support the requisite communication links and call processing all as known.

One further entity shown in FIG. 1 is a soft switch 119 that provides an interface or gateway between the wireless WANs 124, 131 and the PSTN 117. The soft switch 119 interfaces with the HLR 121 and thus supports mobility of communications units within the packet data WAN 131 and between the LAN and the WANs as well as routing via the WAN or PSTN. The soft switch provides an IP address via the WAN 131 to the Residential Gateway 111 at initialization that is used for subsequent interaction between the gateway and the soft switch, e.g. for WAN sessions via the WAN 131. It also provides session processing and controls media connection switching and signaling for the communication units 113. The soft switch acts as a gateway between networks by translating any control signals from one protocol, such as IP based packet data to Signaling System 7 for interfacing with the PSTN or relevant protocol for interfacing to the MSC 129. The mobility management capabilities of the SS 119 also include handoff, the ability to keep an active session connected and functioning when a cellular unit 113 on the session moves among the coverage areas provided by the base station 125 on the Wan 131. In addition, the call processing software within the softswitch 119 is responsible for routing both callers and subscribers based on information received from the gateway 111. It should be noted that the call routing function may be separate from the soft switch based on implementation priorities and preferences. For example, the information received may instruct the call processing software within the softswitch 119 to deliver callers or calls received to another network, a specific number or to voice mail. The instruction may be to place callers on hold, connect callers with specific communications units, or swap a caller on hold with caller involved in a current call with the unit. In addition, the instruction may include performing conferencing (conference communications unit calls with an administrative application to receive commands, conference callers with the communication units, and generally duplicate typical functionality generally available with a local loop. Accordingly, the call routing function must maintain the logical busy/idle status of the local loop for purposes of call delivery.

Figure 2:
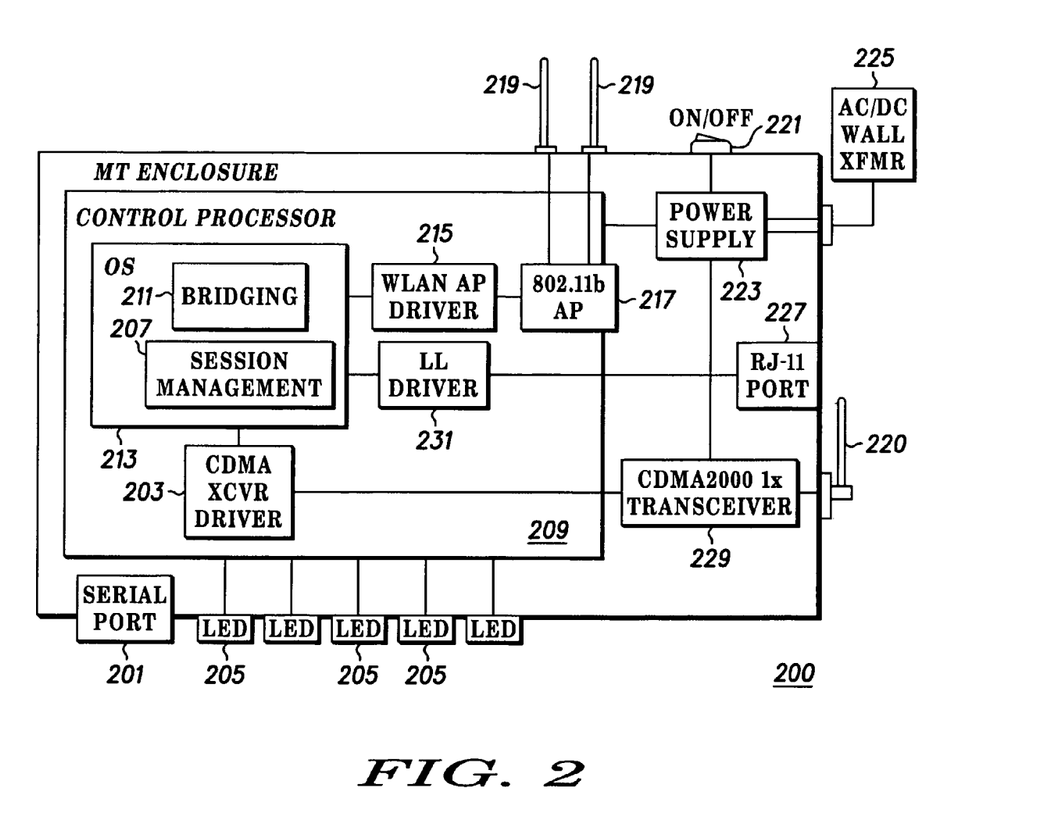
FIG. 2 is a block diagram of an exemplary residential gateway having a wireless wide area network, a wireless local area network, and a local loop interface.

Referring to FIG. 2, a block diagram of an exemplary residential gateway having a wireless wide area network, a wireless local area network, and a local loop interface will be discussed and described. The residential gateway or gateway 200 facilitates residential packet data services via a packet data WAN, such as WAN 131 and represents an alternative access concept in the residence. The service is targeted at residential users of Internet access services and is intended to compete with other options for access, such as dial-up access. The anticipated user may be adding a second "phone line" to accommodate Internet access or perhaps already has a second phone line. The service is targeted for access performance that is equivalent to or better than existing dial-up services at competitive pricing. The service may be most prevalent in and offered by cellular carriers in largely suburban and city neighborhood areas. The service is suitable as a second phone line including voice service as well as data. Perhaps, the service provided with the gateway evolves to become a wireless replacement for some wired local access. The subscriber uses a wireless LAN client at each of one or more computers to form a home network with the WLAN 802.XX, (depicted as 802.11b but can include 802.11g. 802.11a, or other wireless LAN access technologies such as HiperLan) access point 217 in the residential gateway 200. The gateway also includes a modem that supports a high speed or 3G packet data link with the packet data WAN 131. This modem connection provides an always-on WAN connection to an Internet Service Provider (ISP) and thus the Internet 123. Thus the computer user uses the LAN connection to the gateway to gain a connection to the Internet.

The residential gateway 200 is optimally placed in a location offering good wireless WAN coverage, typically at a window. Power to the residential gateway 200 is nominally provided by an AC/DC wall transformer 225, internal power supply 223, and ON/OFF switch 221. LEDs 205 indicate the operating status of the residential gateway 200.

The residential gateway 200 includes one or more input ports capable of receiving different wired signals simultaneously or separately. A serial port 201 is capable of receiving a signal from a router, cable box, satellite dish, or DSL connection, for example. The serial port 201 can provide access to an Internet service provider (ISP), which would provide wired access to the Internet. The residential gateway 200 is connected via two or four wire cable to the local loop 105 and thus PSTN 117 via an RJ-11 port 227, or the like. The residential gateway 200 also includes multiple antennas 219, 220 that receive different wireless signals enabling wireless communication with cordless or wireless communications units 113 and the WANs 124, 131, respectively. The antennas 219 are capable of receiving wireless signals or signals from a local area network (LAN), such as a home computer or units 113 via an 802.XX access point (AP) 217, or the like, and the antenna 220 exchanges signals with the cellular or packet data WAN via, for example, a CDMA transceiver 229 (part of the modem noted above), or the like. For example in addition to the wireless communication units 113, a telephone, television, computer, or printer if properly configured can all be connected to the residential gateway 200 either by wires or wirelessly.

Still referring to FIG. 2, a control processor or controller 209 is configured to support and control the functionality of the gateway. The control processor 209 runs an operating system (OS) 213, such as UNIX, or the like. The operating system facilitates the execution of one or more programs. For example, the control program in the OS 213 may include high-level control software, session managers as well as one or more databases storing relevant control information. The control program initiates one session management routine 207 for each call in progress. The session manager receives and processes various signals from the call processing function routines and provides the necessary instructions to those routines to execute each individual call processing function. The control program also controls or administers TCP/IP addressing functions and initiates certain necessary signaling communications. The control processor or controller 209 determines which network will be used to route call requests and whether a WAN, local loop, or wireless LAN type of session should be established. The bridging routine 211 allows the different sessions to communicate with each other and change session types. The programs include driver routines for wireless LAN AP driver 215 coupled to 802.XX AP 217, CDMA transceiver driver 205 coupled to CDMA transceiver 229, and local loop driver 231 coupled to RJ-11 port 227.

When a wireless communications unit 113 moves to a location in or near a residence having a residential gateway 200, the control processor or controller 209 directs the wireless LAN transceiver, 802.XX AP 217, which is coupled to and cooperatively operable with the control processor 209, to form an association with the wireless communications unit. In certain embodiments, the wireless communications unit recognizes the residential gateway (RG) 200 by receiving a beacon from the wireless LAN transceiver 802.XX AP 217 and thereafter the communication unit and residential gateway form the association in a known manner. The WAN transceiver 229 is operable on the wireless WANs 124, 131, in certain embodiments a packet data WAN, a 3G WAN, a UMTS WAN, or other broadband WAN.

The WAN transceiver 229 and the controller cooperatively operate to support a wireless connection with the WAN and forward a message via the WAN that corresponds to or affects call routing whenever the association with the wireless communication unit changes. For example, when an association with a wireless communication unit is formed, a registration message is sent via a WAN session to the WAN, specifically directed to the soft switch 119. The registration message affects a call routing update so that calls to the wireless communications unit are routed to the local loop and thus the gateway 111, 200 when the association is formed. The CDMA transceiver 229 and the control processor also operate to receive an acknowledgement of the registration message via the WAN session. This registration message results in the wireless communication unit basically deregistering from the WAN and updating the home location register so that calls are delivered to the soft switch 119 and thus in certain embodiments forwarded to the local loop.

In one embodiment the gateway via the transceiver and controller sends the message to the soft switch 119 via a WAN session and the soft switch will initiate a location update procedure with the HLR 121. The HLR 121 updates the location information for the relevant communication unit 113 to provide a virtual location area. This may appear to be a visited cellular system or a portion of the home cellular WANs coverage area to the cellular WAN 124 and will conform to the appropriate standards for location information in the HLR. Note that the HLR may be resident in the cellular WAN 124 (e.g. MSC 129) or associated with the soft switch. The HLR acknowledges the registration message to the soft switch and an acknowledgment message is sent to the gateway via the WAN session. The gateway will assign a local LAN address to the communications unit as part of this registration procedure.

Alternatively when the association changes, the WAN CDMA transceiver 229 and the controller 209 operate to send a deregistration message via a WAN session to the WAN 131, specifically directed to the soft switch 111. The deregistration message effects a call routing update so that calls to the wireless communications unit are not routed to the local loop when the association is no longer available. The CDMA transceiver 229 and the control processor 209 also operate to receive an acknowledgement of the deregistration message via the WAN session. In more detail and in certain embodiments the deregistration message is another registration message that is sent to soft switch and appropriate location update procedures are then performed with the HLR. This message is acknowledged by the HLR and the soft switch acknowledges the request to the gateway.

The association between the gateway and the communication unit will no longer be available, for example when the communication unit is powered off, moves out of an actual or desired range of the wireless LAN or gateway, or some user intervention that interrupts the association. Note that either the communication unit or gateway can determine that the signal quality has dropped to the point that a reliable wireless LAN connection can no longer be maintained or if the unit has access to location information, such as GPS position information or coordinates the unit may decide or determine that the desired range has been exceeded. In either case the association can be dropped or discontinued. Presumably at this point the wireless communication unit will register directly via the cellular WAN and calls for the unit or from the unit will be handled directly using known techniques via the cellular WAN 124 or possibly packet data WAN 131.

A local loop interface, RJ-11 port 227, is coupled to and is cooperatively operable with the control processor 209 to support a connection with a local loop when appropriate. In operation the gateway has a number of applications, most directed to call routing that will favor routing calls, incoming and outgoing, to the local loop rather than the WANs 124, 131 when appropriate. For example, when the controller 209 cooperatively with the local loop interface 227 receives an incoming call indication via the local loop, the controller with the wireless LAN transceiver 217 will operate to forward the incoming call indication via a wireless LAN session to the wireless communications unit 113 and receive a response from the wireless communications unit. Once a response is received the gateway (controller and local loop interface) will answer an incoming call corresponding to the incoming call indication on the local loop and couple the incoming call to the wireless communications unit via the wireless LAN session with the communications unit. Note that the forwarding the call to the wireless communication unit can be a configuration parameter for the gateway and may be unconditional (always), never, or conditioned on the identity of the wireless communication unit, a caller identity (caller ID), and so forth.

Another example of operation where the gateway controls call routing via a selected network is where the wireless LAN transceiver 217 cooperatively with the controller 209 receives a call request from the wireless communications unit via a wireless LAN session. In this instance when the local loop is available, the controller cooperatively with the local loop interface initiates a local loop call request to a public switched telephone network and receives, responsive thereto, one of a call ringing, a call answer and a busy signal. An appropriate message corresponding to the call ringing, e.g. ringing, call answer, or busy signal can be applied via the wireless LAN session for the benefit of the wireless communication unit. Basically the gateway issues a call request via the local loop to the PSTN and handles call setup. If the PSTN replies with a call answer the call is coupled to the communication unit via the wireless LAN session.

Note that whether the local loop is available includes the controller together with the local loop interface monitoring the local loop for a busy condition (off hook) prior to initiating the local loop call request. When a call answer is received from the PSTN or when a call request is sent to the PSTN or as part of this process of initiating the local loop call request, the controller cooperatively with the WAN transceiver sends a message via a WAN session and the wireless WAN 131 to the soft switch indicating that the local loop is busy. A corresponding message is sent to the soft switch via a wireless WAN session indicating the local loop is idle when a call corresponding to the local loop call request has been completed as indicated, for example, by either party hanging up. Note that when the soft switch 111 knows that the local loop is busy, inbound calls to the wireless communication unit will not be forwarded to the local loop via the soft switch but rather will be routed normally to the communications unit via the appropriate WAN 124, 131.

Alternatively, e.g. local loop is not available, as determined by the controller 209 together with the local loop interface 227 monitoring the local loop for a busy condition and the busy condition being detected, the controller cooperatively with the WAN transceiver initiates a WAN call request corresponding to the call request via the WAN and responsive thereto receives, from the WAN, a status message corresponding to one of call ringing, a busy signal, and a call answer. The controller together with the wireless LAN transceiver in some embodiments can then forward to the wireless communications unit via the wireless LAN session a message corresponding to the status message.

When the status message is a call answer, the controller and the WAN transceiver operate to set up a WAN call via the WAN session and the controller and the wireless LAN transceiver operate to couple the WAN call to the wireless communications unit via the wireless LAN session and bridging 211 and session management 207 routines. Thus an end-to-end voice path is established, via VoIP packet data techniques in some embodiments, and conversation occurs. If the status message is a busy signal or the called party does not answer, e.g. communications unit hangs up or gives up or a time out occurs or after the conversation is over indicated by a party hanging up the wireless WAN, soft switch, HLR, etc, will release all resources and clear all status information related to the call or would be call. Note also that when the busy condition is detected the controller further determines whether the busy condition results from an other wireless LAN session with the wireless communications unit and if so, the controller together with the local loop interface operates to initiate a conference call via the local loop utilizing known techniques.

Thus, the gateway operating in the environment of FIG. 1 is capable of routing traffic via a preferential network, presumably lower cost network when that network is available without undue inconvenience to a user. The gateway could also be used, for example, in a business application for a small office location and would control registration and validation procedures to limit service to only the wireless communications units authorized by the owner of the system, e.g. to limit usage to employees. Another application relates to public wireless access in an airport, shopping center, hotel/convention center, or the like. The system would control registration and validation procedures and might limit service to only the wireless communications units supplied to temporary subscribers.

Figure 3:
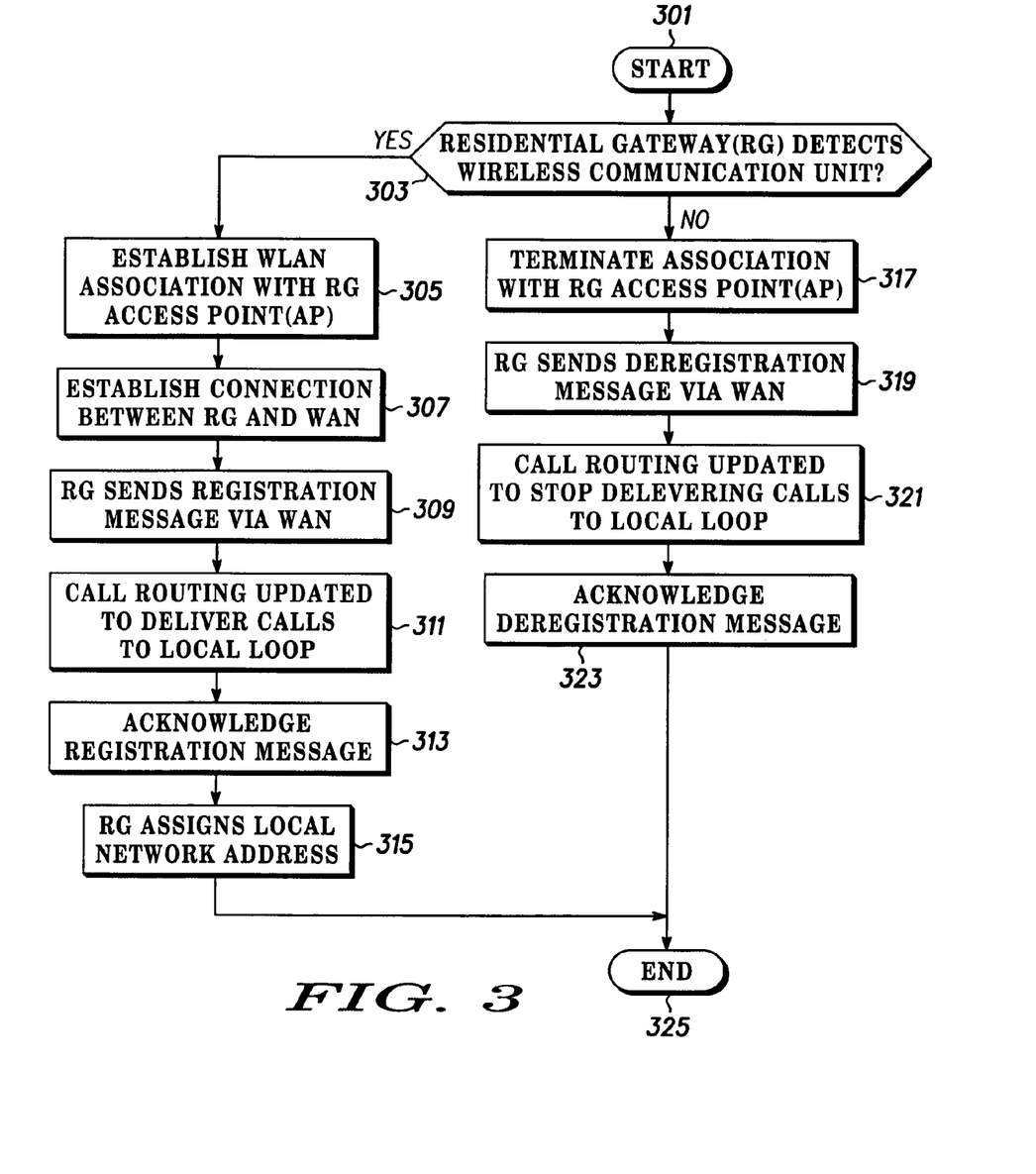
FIG. 3 is a flow diagram of a method of controlling call routing for a communication unit via a selected network.

Referring to FIG. 3, a flow diagram of a method of controlling call routing for a communication unit via a selected network will be described and discussed. Some of this discussion will be in the nature of a review of the above noted concepts and principles and thus will be presented in a summary fashion. Also note that this method of FIG. 3 and following methods will be discussed within the context of the structures and apparatus reviewed above. It is understood that these structures and so forth are merely exemplary and that the methods can be advantageously practiced in other devices, structures, and the like provided similar functionality is available.

The process starts at 301, and is typified for example by a wireless communications unit migrating or moving toward or away from a location having a residential gateway or gateway 200 located therein. If the communication unit is recognized, e.g. authorized by the gateway then at 303, the wireless communication unit determines whether to register or deregister from, e.g. form or drop an association with, the gateway. More specifically at 303, if the gateway detects a wireless communications unit 113 operable on the corresponding wireless LAN, at 305 a wireless LAN association is established with the gateway or residential gateway (RG) access point (AP). At 307 a connection is established between the RG and the WAN, specifically the soft switch via the wireless WAN, although this connection likely already exists long before the association with the communications unit. At 309 a registration message is forwarded via a WAN session to the soft switch. The message includes and effects call routing information and updates for the wireless communications unit. As noted above this message is directed to the soft switch (SS). 119 which may in turn, initiate location update procedures corresponding to the wireless communication unit at the HLR 121. In this fashion at 311 call routing is updated and calls to the wireless communications unit are routed and thus delivered to the local loop 105 that is coupled to the RG. At 313, the registration message is acknowledged by the HLR and thus soft switch and an acknowledgement of the registration message is received by the RG via a WAN session. The RG assigns a local area network address for wireless communications unit at 315, responsive to the acknowledgement. The control processor of the RG operates to assign a LAN address to the wireless communications unit, responsive to the acknowledgment. Thus, when the wireless communications unit associates with the RG 200, a "location update" directive is sent to the HLR so that calls to the wireless communication unit are delivered to a selected network, e.g. PSTN local loop. The process ends at 325.

The procedure for deregistering or disassociating a wireless communications unit with or from the RG 200 of FIG. 2 will be described below. When the wireless communications unit is powered off, moves away from or otherwise deregisters from the RG 200, the following procedure occurs to terminate the association with the RG 200. Thereafter presumably the wireless communications unit will need to be served directly by the WAN 124 or cellular system or perhaps another residential gateway and will thus register with the system. A wireless communications unit or RG can terminate the association with the RG 200, as a result of various situations, such as (1) location tracking with present location greater than desired distance from RG 200; (2) access point link quality no longer sufficient; or (3) a user indication via human interaction with device.

Thus when a wireless communications unit is not detected at 303, the association is terminated with the RG AP at 317. When the association has been terminated, the RG 200 sends a deregistration message to the WAN, specifically soft switch, via a WAN session at 319. The SS initiates an appropriate location update procedure with the HLR. The subscriber is not reachable at this time and until it re registers. The deregistration or location update message effects a call routing update so that calls to the wireless communications unit are not routed to a local loop that is coupled to the RG when the wireless communications unit is no longer detected. The location information is updated in the HLR and the soft switch call routing is updated to stop delivering calls to the local loop at 321. The subscriber will become reachable the next time the wireless communications unit registers with the cellular system or associates with the RG 200. In typical operation, this will occur as soon as the wireless communications unit recognizes the cellular system. The HLR acknowledges the deregistration request to the SS and the SS acknowledges the deregistration request to the RG 200 at 323 via the WAN session. The process then ends at 325 but is continually repeated starting at 303 to determine whether the residential gateway detects a wireless communications unit.

Figure 4:
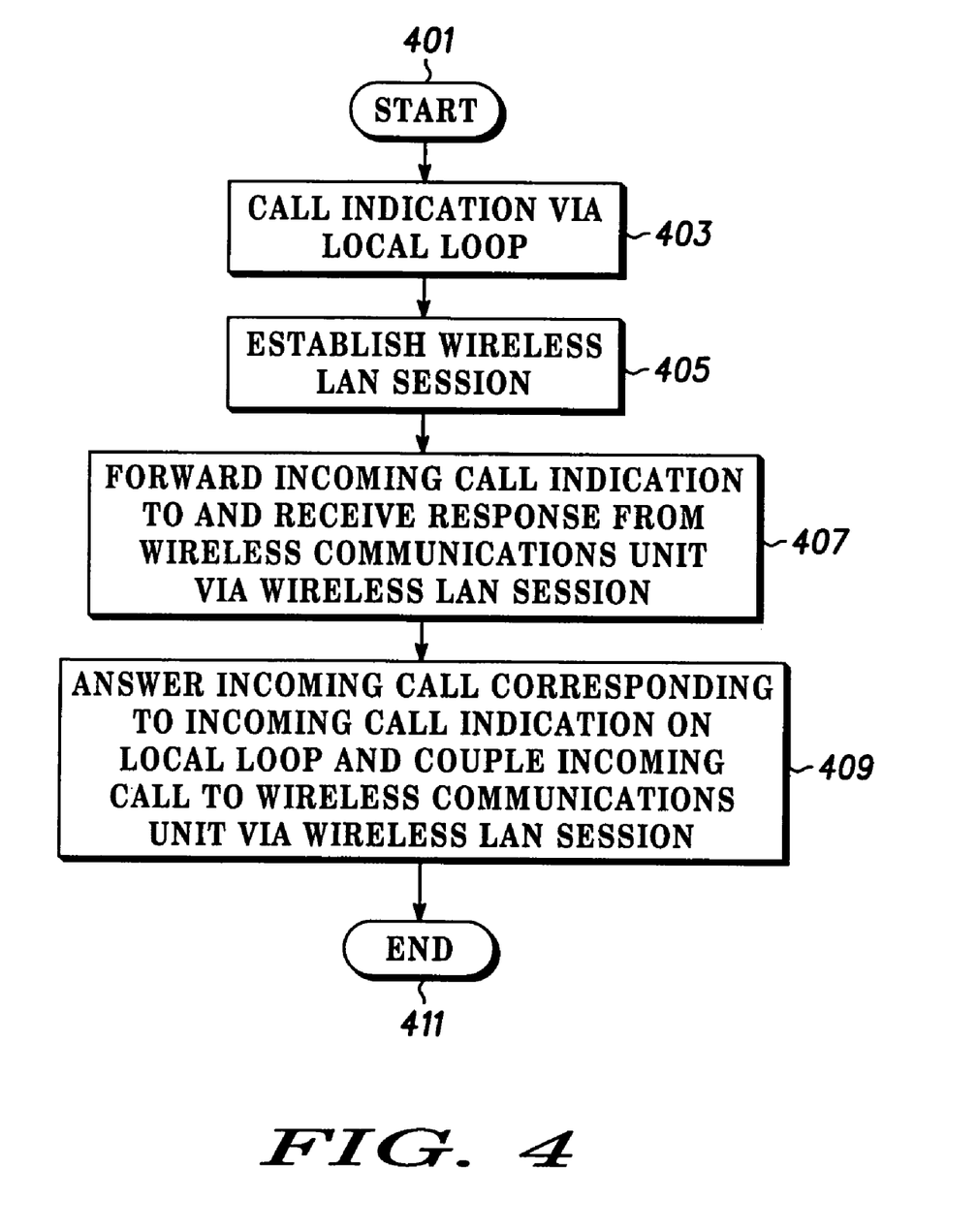
FIG. 4 is a more detailed flow diagram of a method used to select a network for routing incoming calls.

Referring to FIG. 4, a more detailed flow diagram of a method used to select a network for routing incoming calls will be discussed and described. The method of FIG. 4 is undertaken assuming the wireless communication unit 113 has associated with the gateway 200 via for example the method of FIG. 3 and that calls for the unit are being delivered via the local loop. The method begins at 401 and at 403 receiving an incoming call indication via the local loop is shown. Note that the soft switch 119 selects the local loop for call delivery based on busy/idle status maintained in the call routing function of the soft switch. At 405 establishing a wireless LAN session with the communications unit is undertaken. Next at 407 forwarding the incoming call indication to and receiving a response from the wireless communications unit via the wireless LAN session is shown. As noted earlier the forwarding the incoming call indication can be configured and conditional. Receiving the response normally entails receiving a call answer or off hook indication. If the communication unit does not answer the call then the response will not be received and the call will not be answered by the gateway 200. Of course another POTS unit 103 may answer the call or answering machine and the like. Given that the response is received and the call has been answered by the communication unit, at 409 the gateway answers an incoming call corresponding to the incoming call indication on the local loop and couples the incoming call to the wireless communications unit via the wireless LAN session. When the call is over e.g. a party hangs up, the gateway 200 drops the session and hangs up the local loop and the method ends at 411.

Figure 5:
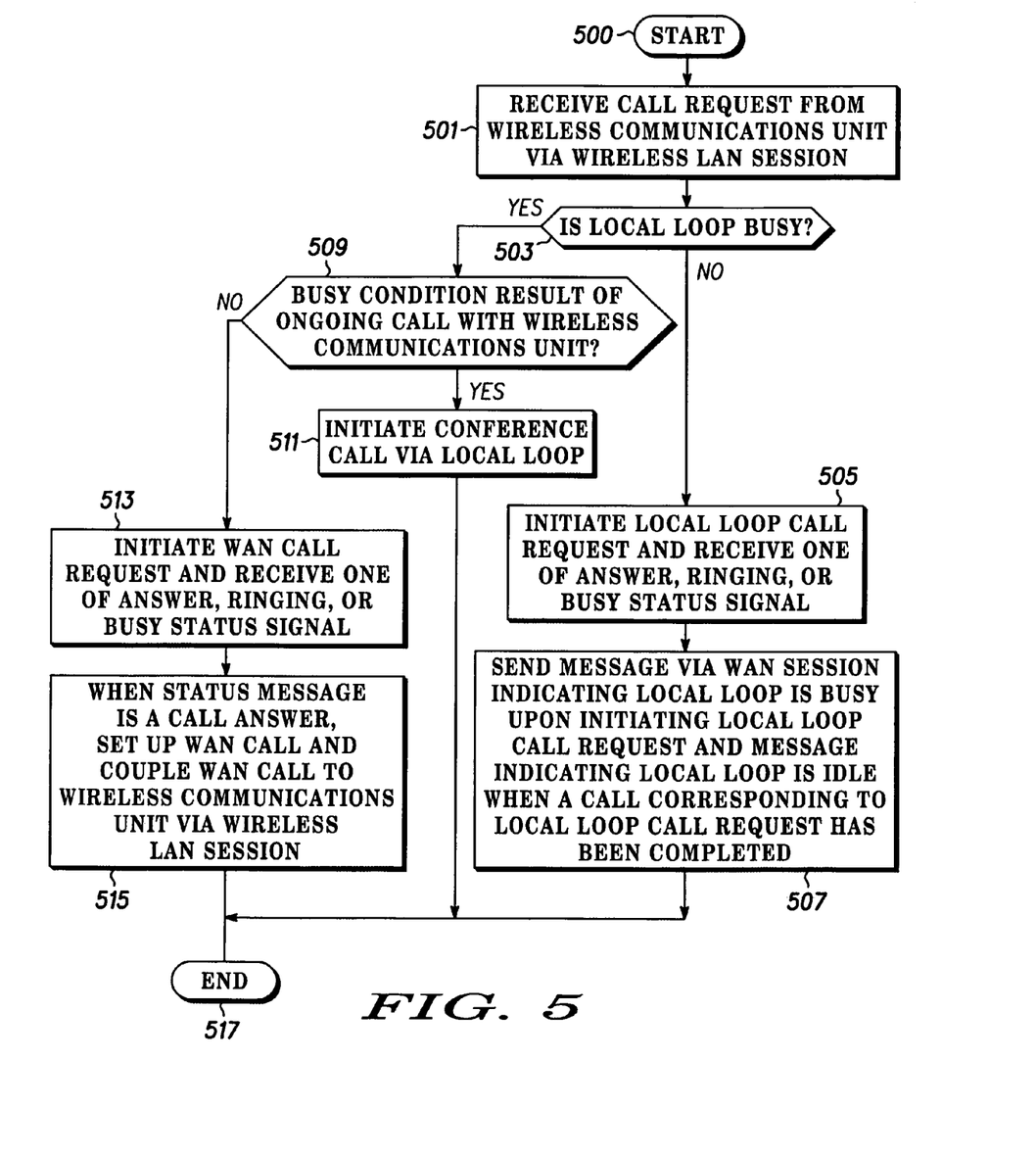
FIG. 5 is a more detailed flow diagram of a method used to select a network to route outgoing calls.

Referring to FIG. 5, a more detailed flow diagram of a method used to select a network to route outgoing calls will be discussed and described. As above various references to the previously described structures such as the gateway will be used for the sake of clarity and convenience. However it is understood that other apparatus with similar functionality can be used advantageously to practice the method of FIG. 5. Furthermore some of the discussions below cover concepts and principles previously disclosed and discussed and thus will be presented in the nature of a summary. The method of FIG. 5 presumes that the method of FIG. 3 has been undertaken and that a wireless communication unit is associated with a gateway and that incoming calls are being routed via the selected network, or local loop. The method begins at 500 and at 501 a call request for a particular party or number is received from the wireless communication unit via a wireless LAN session. At 503 whether the local loop is busy is determined by for example monitoring the local loop for a busy condition via known techniques. When the local loop is not busy, 505 shows initiating a local loop call request corresponding to the call request to a public switched telephone network and receiving one of a call ringing, a call answer and a busy status signal. As noted above the appropriate message corresponding to the status signal can be sent to the communication unit if desired. At 507 sending a message via a WAN session indicating the local loop is busy upon initiation of or as part of the local loop call request or ensuing and corresponding call is undertaken. When the corresponding call has been completed, a message indicating the local loop is idle is sent with these messages having the effects discussed herein above. The method then ends at 517.

When the local loop busy condition is detected at 503, a further determination is made at 509, specifically whether the busy condition results from another ongoing wireless LAN session with the same wireless communication unit. If so at 511, a conference call is initiated via the local loop according to known techniques. Note that the message that the local loop is busy that was sent at 507 is not necessary, however the message that the local loop is no longer busy will need to be delayed until the communications unit is no longer involved in the conference call. After 511 the method ends at 517. If at 509 the busy condition is not related to the communication unit, 513 shows initiating a WAN call request corresponding to the call request via the WAN and responsive thereto receiving, from the WAN, a status message corresponding to one of call ringing, a busy signal, and a call answer. These status messages or a corresponding message can be forwarded to the communication unit as above noted. When the status message is a call answer, 515 indicates setting up a WAN call and coupling the WAN call to the wireless communications unit via a wireless LAN session. The method then ends at 517.

Thus a method and corresponding gateway has been described and discussed for selecting a network for initiating or routing a call with a wireless communication unit, where the method comprises: receiving a call request from a wireless communications unit via a WLAN session; checking the status of a first network and; when the first network is available initiating, via the first network, a first network call request corresponding to the call request and sending a message via a second network indicating that the first network is no longer available; and when the first network is not available, initiating, via the second network, a second network call request corresponding to the call request. The initiating a first network call request can further comprise: receiving one of a call ringing, a call answer and a busy signal; and sending a message via the second network indicating that the first network is idle when a call corresponding to the first network call request has been completed. Similarly the initiating a second network call request can further comprise receiving, from the second network, a status message corresponding to one of call ringing, a busy signal, and a call answer; and in either situation forwarding to the wireless communications unit a message corresponding to the status message. In other embodiments this method further comprises determining whether the first network is not available as a result of another WLAN session with the wireless communications unit; and when the first network is not available as a result of the another WLAN session, initiating a conference call via one of the first network and the second network. The method can additionally comprises receiving an indication of an incoming call; and selecting one of providing a ringing message to the wireless communication unit, not providing the ringing message to the wireless communication unit, and providing the ringing message to the wireless communications unit depending on a caller identification (ID) of a calling party according to configuration information at the gateway.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of selecting a network for initiating a call, the method comprising:
    receiving at a gateway a call request from a wireless communications unit via a WLAN session;
    checking at the gateway the status of a first network connected to the gateway and;
        when the first network is available initiating by the gateway, via the first network, a first network call request corresponding to the call request and sending by the gateway a message via a second network connected to gateway indicating that the first network is no longer available and wherein initiating a first network call request comprises receiving one of a call ringing, a call answer and a busy signal and sending a message indicating that the first network is idle when a call corresponding to the first network call request has been completed; and
    when the first network is not available, initiating by the gateway, via the second network, a second network call request corresponding to the call request.

2. The method of claim 1, wherein initiating a second network call request further comprises:
    receiving, from the second network, a status message corresponding to one of call ringing, a busy signal, and a call answer; and
    forwarding to the wireless communications unit a message corresponding to the status message.

3. The method of claim 1, further comprising:
    determining whether the first network is not available as a result of another WLAN session with the wireless communications unit; and
    when the first network is not available as a result of the another WLAN session, initiating a conference call via one of the first network and the second network.

4. The method of claim 1, further comprising:
    receiving an indication of an incoming call; and
    selecting one of providing a ringing message to the wireless communications unit, not providing the ringing message to the wireless communications unit, and providing the ringing message to the wireless communications unit depending on a call identification (ID) of a calling party.

* * * * *